(No Model.)
H. L. HAZEN.
TRUCK.
No. 536,522. Patented Mar. 26, 1895.
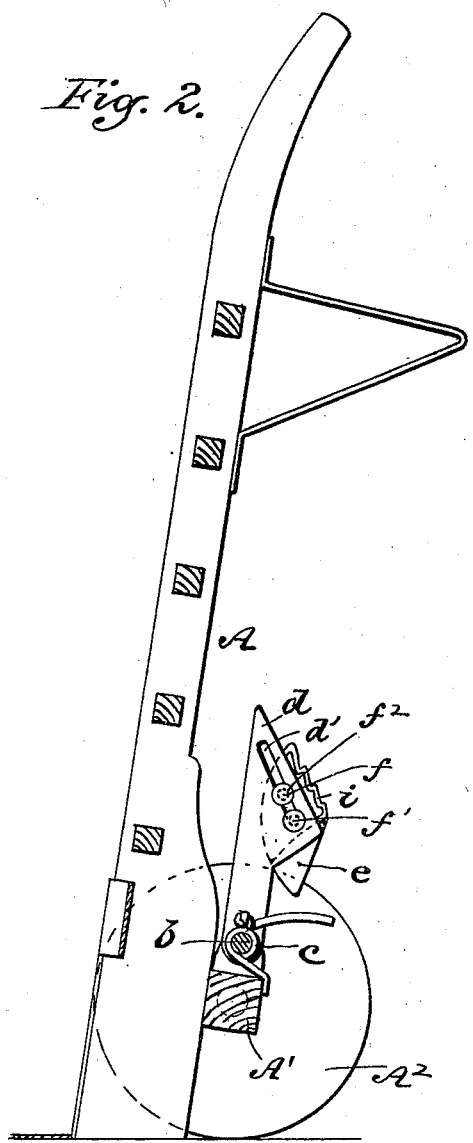
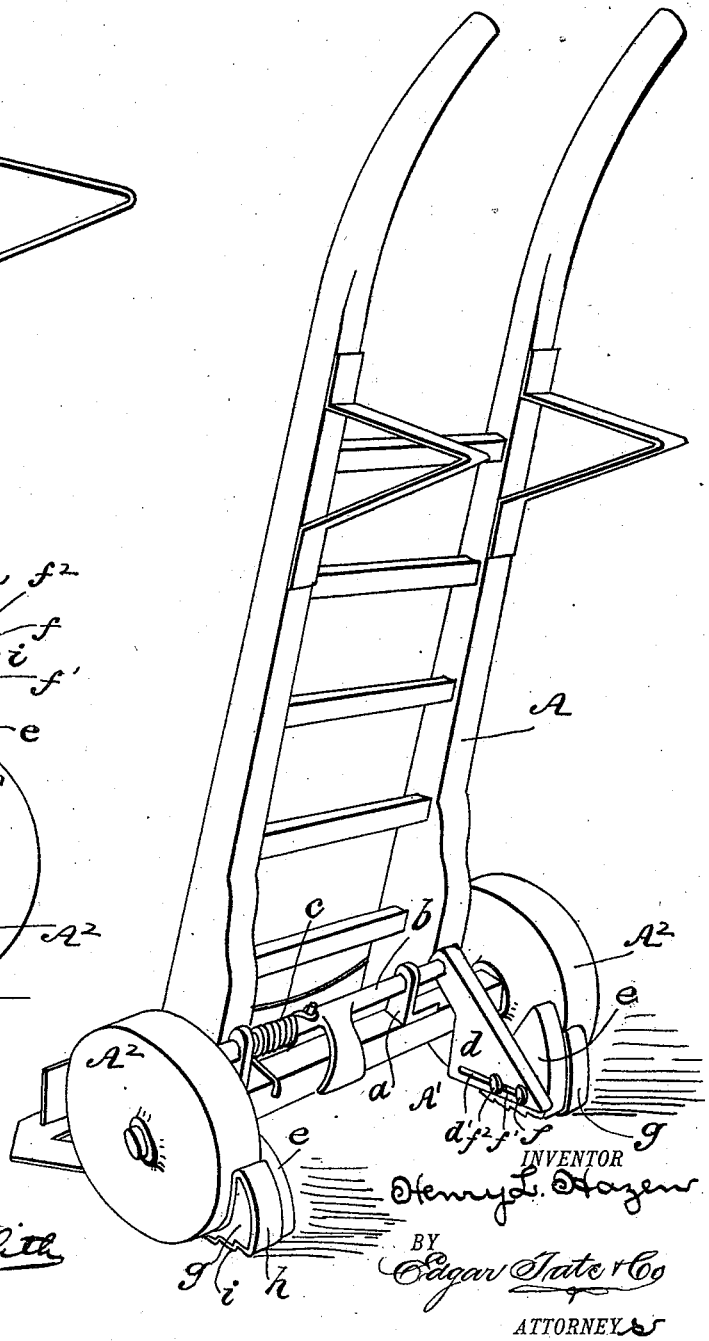
WITNESSES:
John M. Deemer
Percy T. Griffith
INVENTOR
Henry L. Hazen
BY
Edgar Tate & Co
ATTORNEYS

UNITED STATES PATENT OFFICE.

HENRY L. HAZEN, OF PATCHOGUE, NEW YORK.

TRUCK.

SPECIFICATION forming part of Letters Patent No. 536,522, dated March 26, 1895.

Application filed February 24, 1894. Serial No. 501,333. (No model.)

*To all whom it may concern:*

Be it known that I, HENRY L. HAZEN, a citizen of the United States, and a resident of Patchogue, in the county of Suffolk, State of New York, have invented certain new and useful Improvements in Trucks, of which the following is a specification.

This invention relates to hand trucks for carting cases, trunks and similar articles, and has for its object to provide means for braking the wheels of such trucks by the movement of the foot, in order that, when the truck is being wheeled rapidly, or has a heavy object thereon, it may be possible to immediately stop the same at any desired moment.

The invention consists in the novel construction and arrangement of the braking device as hereinafter more fully described and particularly set forth.

In the accompanying drawings forming part of this specification, in which like letters of reference designate corresponding parts throughout, Figure 1 is a perspective view of a truck embodying my invention and provided with my improved device. Fig. 2 is a longitudinal vertical section through the center of the same.

In the practice of my invention, I form upon, or attach to, the axle $A'$ of the truck $A$, sockets $a$ in which is journaled a shaft $b$ having a pedal $b'$ secured upon the center thereof. Surrounding one side of the shaft is a spiral spring $c$ secured both to the said shaft and to the axle $A'$. Mounted on the shaft at each end thereof are the arms or wings $d$ of substantially triangular shape and having at the broad end thereof slots $d'$. At the outer side of each of these wings are the brakes $e$ having studs $ff'$ working in the groove $d'$. These studs have heads $f^2$ which serve to hold the brakes to the wings.

Upon each of the brakes $e$ at the outer side thereof are secured shoes $g$ curved at the inside to correspond with the circumference of the wheels $A^2$. These shoes, which in common with the whole of the device are preferably of iron or other metal, have upon their periphery a covering of rubber or similar elastic or flexible material $h$ and both the said shoes and the brakes have upon the bottom teeth or corrugations $i$.

The operation of the device will be readily apparent from the foregoing description.

The pedal $b'$ being depressed by the foot of the expressman or operator of the truck, the wings $d$ are lowered and the brake shoes $f$ thereby brought into engagement with the wheels and prevent any further movement of the same, thus effectually stopping the truck. The brakes being roughened or corrugated also engage with the ground or surface on which the truck is being wheeled to prevent slipping of the same.

It will be understood that the device may be attached to any ordinary truck now in use in which the end desired is the same. I therefore do not confine myself alone to the use of my invention in connection with the form of truck herein illustrated nor to the exact details of mechanism set forth.

Having thus fully described my invention, what I claim as new, and desire to secure by Letters Patent, is—

1. A brake attachment for trucks, consisting of one or more shoes arranged upon a shaft journaled near the wheels thereof and having an elastic or flexible covering thereon, and a pedal on the shaft adapted to actuate the same and bring the shoes into engagement with the wheels, substantially as shown and described.

2. A brake attachment for trucks, consisting of one or more shoes arranged upon a shaft journaled near the wheels thereof, and having an elastic or flexible covering on the face thereof and roughened at the bottom where they meet the ground, and a pedal upon the shaft adapted to actuate the same and bring the shoes into engagement with the wheels, substantially as shown and described.

3. A brake attachment for trucks, consisting of a shaft journaled near the wheels, wings at each end of the same having grooves therein, shoes at either side of the wings having studs working in the said grooves, a pedal upon the shaft to actuate the same and bring the shoes into engagement with the wheels, and a spring surrounding the shaft adapted to maintain the wings normally in a raised position and the shoes out of engagement with the wheels, substantially as shown and described.

4. A brake attachment for trucks, consisting of a shaft journaled in sockets upon the axle thereof, wings at each end of the same having grooves therein, shoes at either side of the wings having studs working in the grooves, the said shoes being corrugated at the bottom and curved at the face, and elastic or flexible covering thereon, a pedal upon the shaft to actuate the same and bring the shoes into engagement with the wheels, and a spring surrounding the shaft adapted to maintain the wings normally in a raised position and the shoes out of engagement with the wheels, substantially as shown and described.

In testimony that I claim the foregoing as my invention I have signed my name, in presence of witnesses, this 21st day of February, 1894.

HENRY L. HAZEN.

Witnesses:
JOHN T. DARE,
ABRINGTON H. CARMAN,
HENRY McCROWE.